US009871981B1

(12) United States Patent
Lajevardi et al.

(10) Patent No.: US 9,871,981 B1
(45) Date of Patent: Jan. 16, 2018

(54) MULTI-SPECTRAL IMAGING SYSTEM AND METHOD THEREOF

(71) Applicant: Robert Bosch GmbH, Stuttgart (DE)

(72) Inventors: Pedram Lajevardi, Menlo Park, CA (US); Rainer Blechschmidt, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/630,237

(22) Filed: Jun. 22, 2017

(51) Int. Cl.
*H01L 27/144* (2006.01)
*H04N 5/33* (2006.01)
*G01J 3/28* (2006.01)

(52) U.S. Cl.
CPC ............ *H04N 5/332* (2013.01); *G01J 3/2823* (2013.01); *G01J 2003/2826* (2013.01)

(58) Field of Classification Search
CPC . H04N 5/332; H04N 13/025; H01L 27/14649
See application file for complete search history.

(56) References Cited

U.S. PATENT DOCUMENTS

| | | | | |
|---|---|---|---|---|
| 2004/0095492 | A1* | 5/2004 | Baxter | H04N 3/155 348/302 |
| 2012/0087645 | A1* | 4/2012 | Wu | H04N 5/33 396/439 |
| 2012/0257030 | A1* | 10/2012 | Lim | A61B 1/00009 348/70 |

* cited by examiner

*Primary Examiner* — Kenneth J Malkowski
(74) *Attorney, Agent, or Firm* — Maginot Moore & Beck LLP

(57) ABSTRACT

A multi-spectral visual light (VL) and infrared (IR) imaging system and method suitable for use in security cameras, security devices, surveillance cameras, surveillance devices, consumer digital cameras, consumer digital devices, thin clients, thick clients, industrial machine vision systems, automotive cameras, home furnishing cameras, residential cameras, commercial cameras, object detectors, as well as other markets and/or applications is provided. The multi-spectral VL and infrared IR imaging system comprises a plurality of VL imaging sensors, a plurality of infrared (IR) imaging sensors, and a readout assembly operatively connected to the CMOS imaging sensors and the IR imaging sensors, wherein the IR imaging sensors configured to generate thermal signals and operate the CMOS imaging sensors.

18 Claims, 3 Drawing Sheets

MULTI-SPECTRAL IMAGING SYSTEM AND METHOD THEREOF

FIELD

This disclosure relates generally to imaging systems and, more particularly, to multi-spectral visual light (VL) and infrared (IR) imaging systems and methods thereof.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to multi-spectral visual light (VL) and infrared (IR) imaging systems and methods suitable for use in security cameras, security devices, surveillance cameras, surveillance devices, consumer digital cameras, consumer digital devices, thin clients, thick clients, industrial machine vision systems, automotive cameras, home furnishing cameras, residential cameras, commercial cameras, object detectors, as well as other markets and/or applications.

In one aspect of the disclosure, the multi-spectral imaging system comprises a plurality of super pixel groups arranged in an array, each super pixel group in the plurality of super pixel groups comprises a plurality of pixels, implemented in a complementary metal oxide (CMOS) image sensor, for capturing first image data in response to visual light (VL) and an infrared (IR) imaging pixel for capturing second image data in response to IR wavelength ranges between 850 nm and 14000000 nm. The multi-spectral imaging system further comprises a carrier, the plurality of super pixel groups are disposed on the carrier and a readout assembly operatively connected to the plurality of super pixel groups, the readout assembly having a first column readout circuit connected to the VL imaging pixels and a second column readout circuit connected to the IR imaging pixels, wherein the IR imaging pixels are configured to generate thermal signals and operate the VL imaging sensors. The multi-spectral imaging system further comprises a controller communicatively connected to the plurality of the super pixel groups, the controller being configured to operate at least one of the VL imaging pixels and the IR imaging pixels. The multi-spectral imaging system further comprises switching elements connected to the controller to switch the multi-spectral imaging system between an IR imaging mode and a VL imaging mode. When the multi-spectral imaging system in the IR imaging mode, the VL imaging pixels are deactivated. When the multi-spectral imaging system in the VL imaging mode, the IR imaging pixels are deactivated. The multi-spectral imaging system further comprises a processor communicatively connected to the plurality of the super pixel groups, the processor being configured to process first and second image data and evaluate the processed first and second image data.

In another aspect of the disclosure, a method of making a multi-spectral imaging system comprises providing a carrier, forming a plurality of super pixel groups arranged in an array on the carrier, each super pixel group in the plurality of super pixel groups comprises a plurality of pixels, implemented in a complementary metal oxide (CMOS) image sensor, for capturing first image data in response to visual light (VL) and an infrared (IR) imaging pixel for capturing second image data in response to IR wavelength ranges between 850 nm and 14000000 nm. The method further comprises forming a readout assembly on the carrier, the readout assembly including a first column readout circuit connected to the VL imaging pixels and a second column readout circuit connected to the IR imaging pixels, wherein the IR imaging pixels are configured to generate thermal signals after a presence is detected and operate the VL imaging pixels. The method further comprises providing a controller, the controller being configured to operate at least one of the VL imaging pixels and the IR imaging pixels and providing switching elements, the switching elements being connected to the controller for switching the plurality of super pixel groups between an IR imaging mode and a VL imaging mode.

In another aspect of the disclosure, an apparatus comprises a plurality of pixels, implemented in a complementary metal oxide (CMOS) image sensor, for capturing first image data in response to the visual light (VL) and a plurality of infrared (IR) imaging pixels for capturing second image data in response to IR wavelength ranges between 850 nm and 14000000 nm, a carrier, the plurality of super pixel groups are disposed on the carrier, and a readout assembly, wherein the VL imaging pixels configured to generate sensor signals and transmit the sensor signals to the readout assembly and the IR imaging pixels configured to generate a thermal signal and transmit the thermal signals to the readout assembly. The readout assembly comprises a first column readout circuit and a second column readout circuit, wherein the sensor signals generated by the VL imaging pixels are being transmitted to the first column readout circuit and the sensor signals generated by the IR imaging pixels are being transmitted to the second column readout circuit. The apparatus further comprises a controller, the controller being configured to operate at least one of the VL imaging pixels and the IR imaging pixels, and switching elements connected to the controller to switch the apparatus between an IR imaging mode and a VL imaging mode. When the apparatus in the IR imaging mode, the VL imaging pixels are deactivated. When the apparatus in the VL imaging mode, the IR imaging pixels are deactivated.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 1:
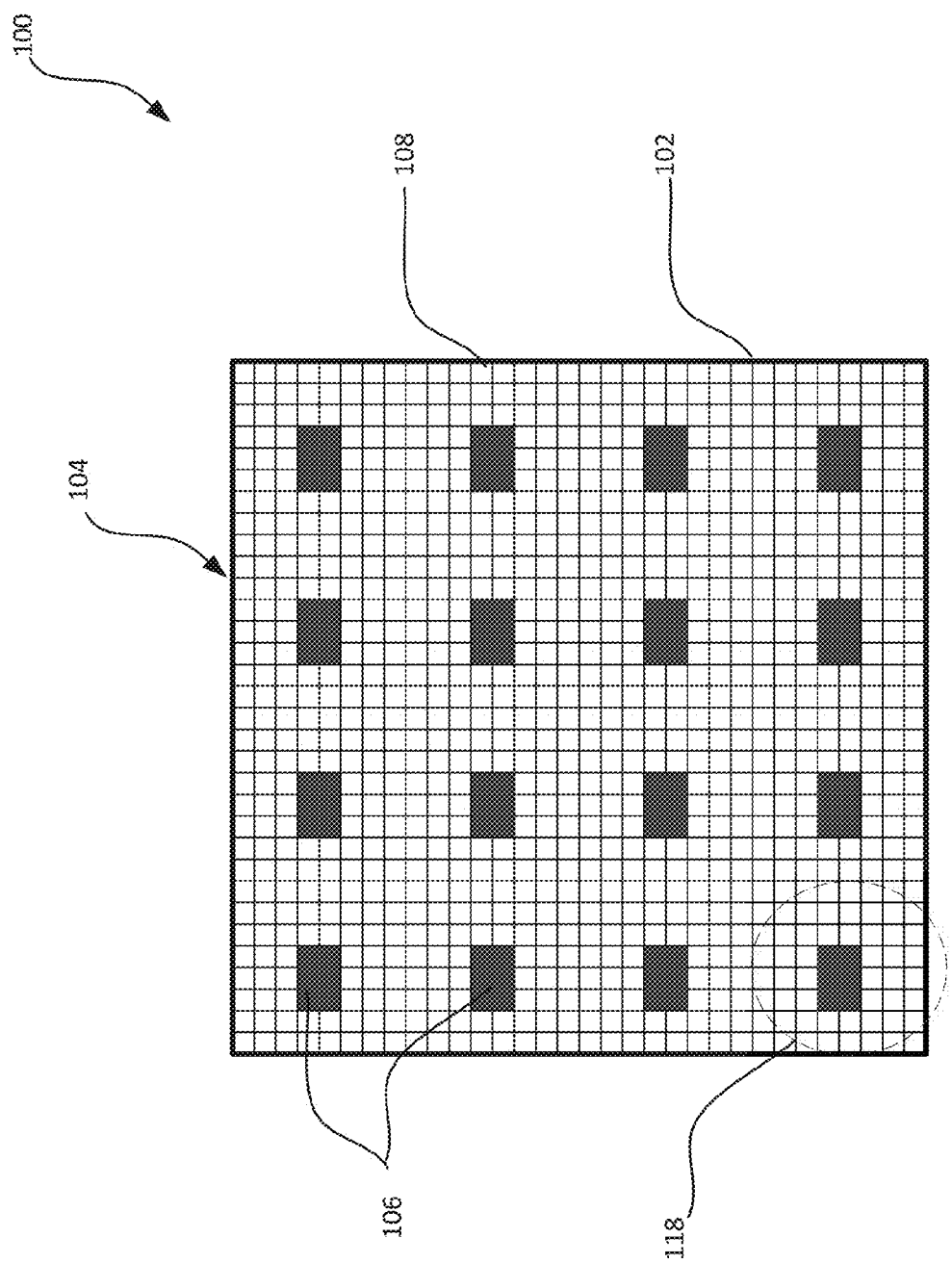
FIG. 1 is a diagram depicting an embodiment of a multi-spectral visual light (VL) and infrared (IR) imaging system.

FIG. 1 is a complementary metal oxide semiconductor (CMOS) multi-spectral visual light (VL) and infrared (IR) imaging system 100. The system 100 comprises a plurality of super pixel groups 118 arranged in a two-dimensional array. Each super pixel group 118 in the plurality of super pixel groups comprises a first plurality of individual imaging sensors or pixels 108 that are sensitive to visible light (VL) and a second plurality of individual IR imaging sensors or pixels 106 that are sensitive to heat, IR, and/or near IR (NIR) in the range between 850 nm-14000000 nm. Different information is carried at different wavelengths by the VL imaging sensors 108 and the IR imaging sensors 106. A carrier or a substrate 102 is provided for supporting the VL imaging sensors 108 and the IR imaging sensors 106. In one embodiment, the plurality of VL imaging sensors capture first image data in response to the visual light (VL) and the infrared (IR) imaging sensors capture second image data in response to heat, IR, and/or near IR (NIR). The IR imaging sensors configured to generate thermal signals after a presence of a target is detected and operate the CMOS imaging sensors. The target may be a person, an animal, or any suitable objects that radiate heat, IR, and/or near IR (NIR).

Figure 2:
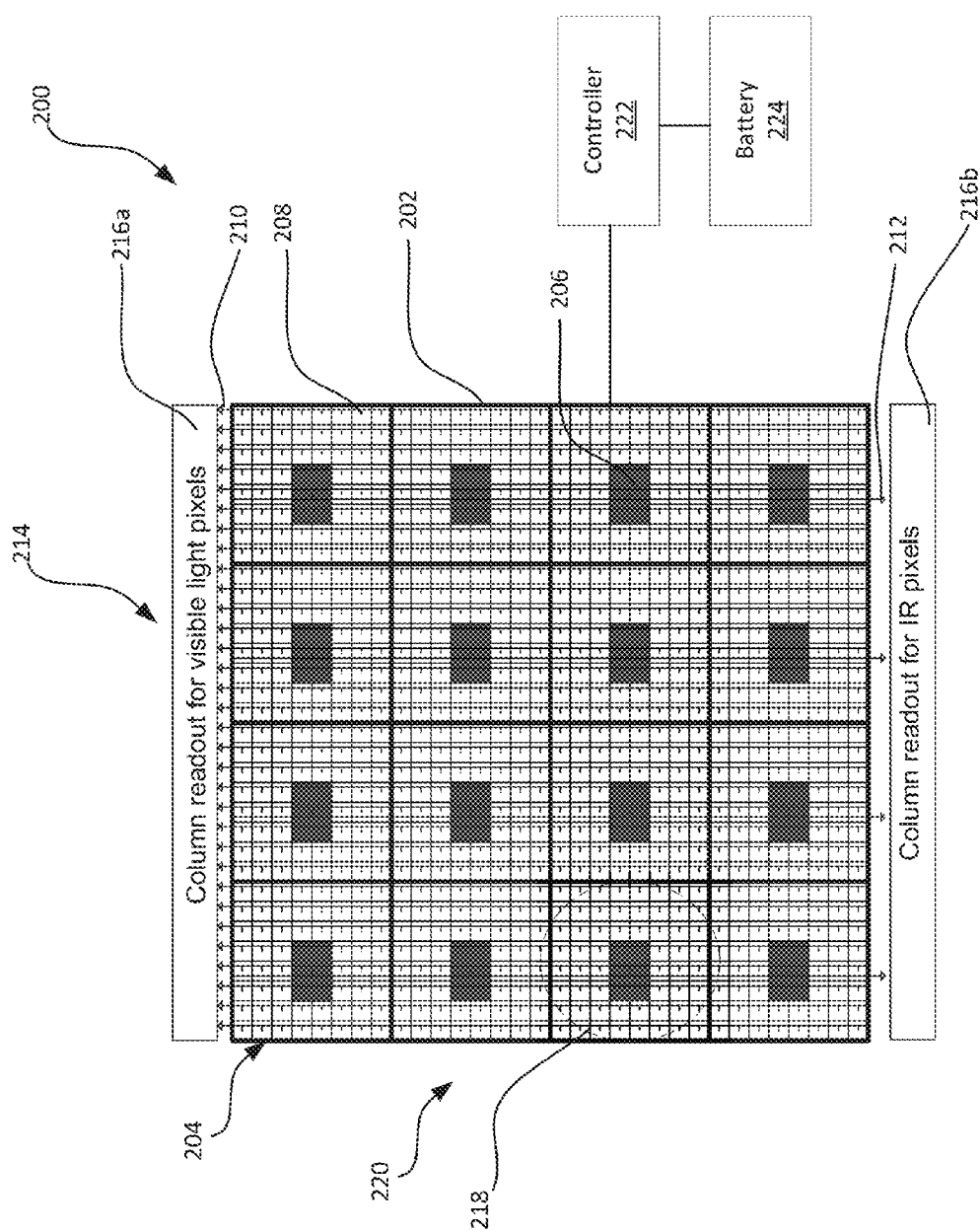
FIG. 2 is a functional block diagram depicting an embodiment of a super pixels imaging system.

FIG. 2 is a functional block diagram depicting an embodiment of a super pixels imaging system 200 that is configured for simultaneous operation as a VL imaging device and as an IR imaging device. The super pixel imaging system 200 is one example implementation of a multi-spectral VL and infrared IR imaging system 100 depicted in FIG. 1. The illustrated embodiment of the super pixels imaging system 200 comprises a plurality of pixel elements 220 grouped together into 8×8 arrangements of super pixels 218. As used herein, the term "super pixel" refers to a group of individual pixels in the super pixels 220 where some pixels, such as pixels 206, operate as IR imaging sensors while the remaining pixels, such as pixels 208, operate as VL imaging sensors. Of course, the configuration of pixels depicted in FIG. 2 is merely illustrative of one example of pixel configurations. Alternative embodiments can use different arrangements of IR imaging sensor and VL imaging sensors other than the one example depicted in FIG. 2 without departing from the scope of the disclosure. The super pixel imaging system 200 further comprises a readout assembly 214 having a first column readout circuitry 216a and a second column readout circuitry 216b. VL image data is readout by the first column readout circuitry 216a and the IR image data is readout by the second column readout circuitry 216b. As illustrated, the first column readout circuitry 216a coupled to the super pixels 220 readout a row of VL image data along readout column lines 210. The second column readout circuitry 216b, located opposite from the first column readout circuitry 216a and is coupled to the super pixels 220 readout a row of IR image data along readout column lines 212.

The super pixels imaging system 200 further comprises a controller 222 configured to operate the super pixels 220. The controller 222 is a control device that incorporates at least one of analog and digital control circuitry to operate the super pixels imaging system 200. In some embodiments, the controller 222 is implemented using CMOS digital logic circuits that are physically integrated with the super pixels imaging system 200. In another embodiment, the controller 222 is a discrete control device that is operatively connected to the super pixels imaging system 200 either on a 3D stacked configuration system, mounted back-to-back configuration system, positioned side-by-side configuration system, or other suitable connection. During operation, the controller 222 is configured to operate the VL imaging sensor 208, the IR imaging sensor 206, or both the VL and IR imaging sensors. In one embodiment, the controller 222 operates switching elements in the pixels or super pixels within the imaging system to either switch the pixels or the system 200 between an IR imaging mode and a VR imaging mode. In another embodiment, the controller 222 is connected to switching circuits for each pixel to control the operating mode of each pixel element. In yet another embodiment, the controller 222 is connected to switching circuits for each super pixel group to either activate or deactivate the VL imaging sensor and vice versa. In further yet another embodiment, based on the heat information detected by the IR imaging sensor, the controller 222 is connected to switching circuits for each super pixel group to either activate the VL imaging sensor when an object is presence and deactivate the VL imaging sensor when the object is not presence.

The super pixels imaging system 200 further comprises a processor for processing and evaluating sensor signals generated by the VL imaging sensor 208 and/or the IR imaging sensor 206 and an energy storage device 224 for providing energy power to operate the controller 222, the super pixels 220, and other components in the super pixels imaging system 200 when needed. The energy storage device 224 may be a battery, a super capacitor, or other suitable energy storage device. The super pixels imaging system 200 may be incorporate into security cameras, security devices, surveillance cameras, surveillance devices, consumer digital cameras, consumer digital devices, thin clients, thick clients, industrial machine vision systems, automotive cameras, home furnishing cameras, residential cameras, commercial cameras, object detectors, and so forth.

Figure 3:
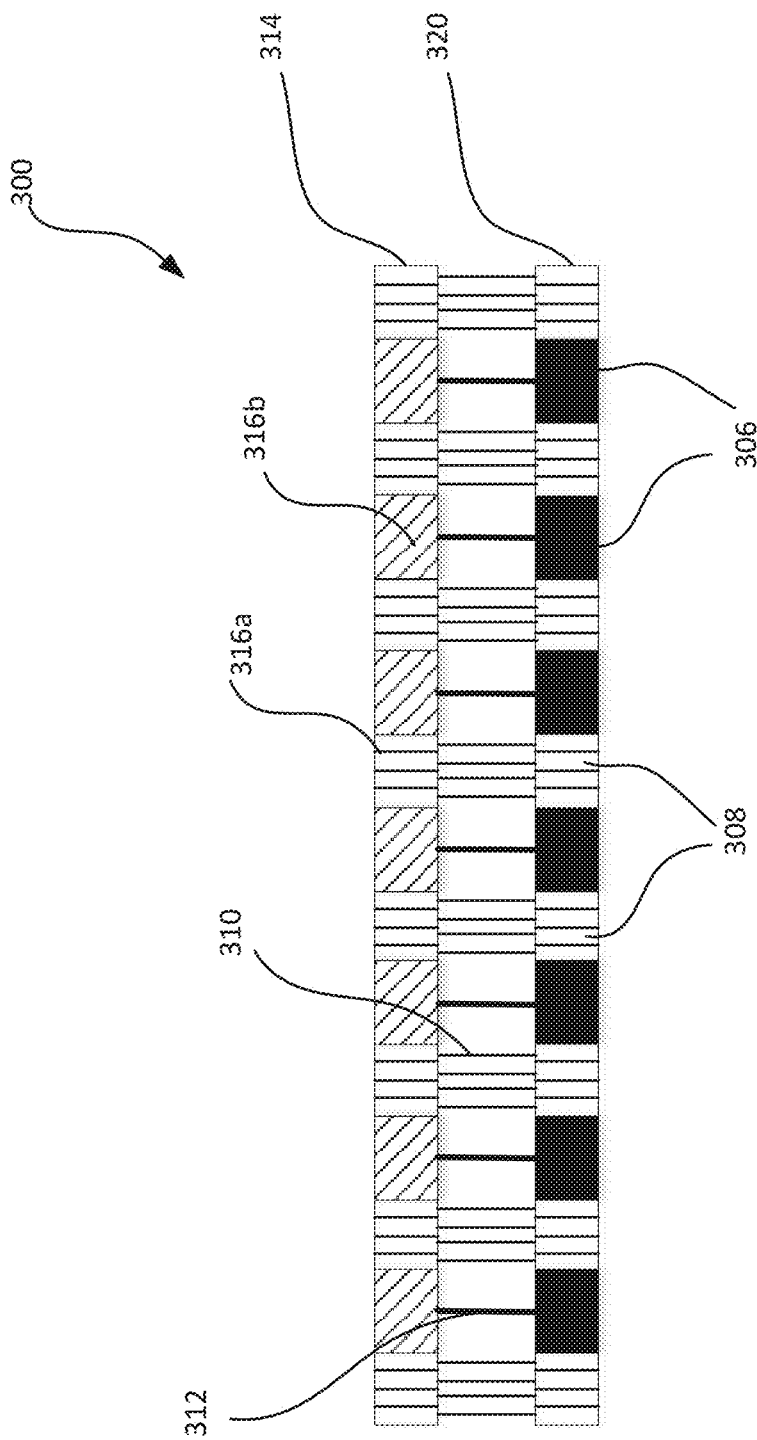
FIG. 3 is a cross-sectional view depicting another embodiment of a super pixels imaging system.

FIG. 3 is a cross-sectional view depicting another embodiment of a super pixels imaging system 300 that is configured for simultaneous operation as a VL imaging device and as an IR imaging device. Unlike from the super pixel imaging system 200, the super pixel imaging 300 comprises a readout assembly 314 either vertically mounted to or vertically stacked on a plurality of pixel elements grouped together into super pixels 320. In one embodiment, individual pixel 306, 308 can be read out by the readout assembly 314. In another embodiment, a plurality of the same pixel 306 or 308 as a group can be read out by the readout assembly 314. In yet another embodiment, a combination of pixels 306, 308 cab be read out by the readout assembly 314. Further yet another embodiment, the pixels 306, 308 can be read out by more than one readout circuit of the readout assembly 314. As illustrated, the readout assembly 314 comprises a first readout circuit 316a and a second readout circuit 316b. A plurality of IR pixels 306 share the same readout circuit 316b are vertically read out by the second readout circuit 316b whereas a plurality VL pixels 308 spared the same readout circuit 316a are vertically read out by the first readout circuit 316a. In alternate embodiment, combination of a column readout circuit and a vertical readout circuit, defines as a readout assembly, may be connected to a plurality of the super pixels 320. For example, the IR pixels 306 can be read out by the column readout circuit 216b illustrated in FIG. 2 whereas the VL pixels 308 can be read out by the vertical readout circuit 314. Vice versa, the IR pixels 306 can be read out by the vertical readout circuit 314 whereas the VL pixels 308 can be read out by the column readout circuit 216a illustrated FIG. 2.

Now back to FIG. 3, VL readout lines 310 coupled the readout assembly 314 to the super pixels 320 where image data are transmitted along the readout lines 310 are readout by the readout assembly 314. IR readout lines 312 coupled the readout assembly 314 to the super pixels 320 where image data are transmitted along the readout lines 312 are readout by the readout assembly 314.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage, a cloud memory or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A multi-spectral imaging system comprising:
a plurality of super pixel groups arranged in an array, each super pixel group in the plurality of super pixel groups comprising:
a plurality of pixels, implemented in a complementary metal oxide (CMOS) imaging sensor, for capturing first image data in response to visual light (VL); and
an infrared (IR) imaging pixel for capturing second image data in response to IR wavelength ranges between 850 nm and 14000000 nm;
a carrier, the plurality of super pixel groups are disposed on the carrier; and
a readout assembly operatively connected to the plurality of super pixel groups, the readout assembly having a first column readout circuit connected to the VL imaging pixels and a second column readout circuit connected to the IR imaging pixels;
wherein the IR imaging pixels are configured to generate thermal signals and operate the VL imaging sensors.

2. The multi-spectral imaging system of claim 1 further comprising a controller communicatively connected to the plurality of the super pixel groups, the controller being configured to operate at least one of the VL imaging pixels and the IR imaging pixels.

3. The multi-spectral imaging system of claim 2 further comprising switching elements connected to the controller to switch the multi-spectral imaging system between an IR imaging mode and a VL imaging mode.

4. The multi-spectral imaging system of claim 3 wherein the multi-spectral imaging system in the IR imaging mode, the VL imaging pixels are deactivated.

5. The multi-spectral imaging system of claim 3 wherein the multi-spectral imaging system in the VL imaging mode, the IR imaging pixels are deactivated.

6. The multi-spectral imaging system of claim 1 further comprising a processor communicatively connected to the plurality of the super pixel group, the processor being configured to process first and second image data and evaluate the processed first and second image data.

7. The multi-spectral imaging system of claim 1 wherein the multi-spectral imaging system is integrated into a camera, a thin client, a thick client, an automotive, a home furnishing device, a home appliance, or an object detector.

8. A method of making a multi-spectral imaging system comprising:
providing a carrier;
forming a plurality of super pixel groups arranged in an array on the carrier, each super pixel group in the plurality of super pixel groups comprising:

a plurality of pixels, implemented in a complementary metal oxide (CMOS) image sensor, for capturing first image data in response to visual light (VL); and an infrared (IR) imaging pixel for capturing second image data in response to IR wavelength ranges between 850 nm and 14000000 nm;

forming a readout assembly on the carrier, the readout assembly including a first column readout circuit connected to the VL imaging pixels and a second column readout circuit connected to the IR imaging pixels;

wherein the IR imaging pixels are configured to generate thermal signals and operate the VL imaging pixels.

9. The method of claim 8 further comprising:

providing a controller, the controller being configured to operate at least one of the VL imaging pixels and the IR imaging pixels.

10. The method of claim 9 further comprising:

providing switching elements, the switching elements being connected to the controller for switching the plurality of super pixel groups between an IR imaging mode and a VL imaging mode.

11. An apparatus comprising:

a plurality of super pixel groups arranged in an array, each super pixel group in the plurality of super pixel groups comprising:

a plurality of pixels, implemented in a complementary metal oxide (CMOS) image sensor, for capturing first image data in response to visual light (VL); and a plurality of infrared (IR) imaging pixels for capturing second image data in response to IR wavelength ranges between 850 nm and 14000000 nm;

a carrier, the plurality of super pixel groups are disposed on the carrier; and a readout assembly;

wherein the VL imaging pixels configured to generate sensor signals and transmit the sensor signals to the readout assembly;

wherein the IR imaging pixels configured to generate thermal signals and transmit the thermal signals to the readout assembly; and wherein the IR imaging pixels are configured to operate the VL imaging sensors.

12. The apparatus of claim 11 wherein the readout assembly comprising:

a first column readout circuit; and a second column readout circuit;

wherein the sensor signals generated by the VL imaging pixels are being transmitted to the first column readout circuit; and wherein the sensor signals generated by the IR imaging pixels are being transmitted to the second column readout circuit.

13. The apparatus of claim 12 further comprising a controller, the controller being configured to operate at least one of the VL imaging pixels and the IR imaging pixels.

14. The apparatus of claim 13 further comprising switching elements connected to the controller to switch the apparatus between an IR imaging mode and a VL imaging mode.

15. The apparatus of claim 14 wherein when the apparatus in the IR imaging mode, the VL imaging pixels are deactivated.

16. The apparatus of claim 14 wherein when the apparatus in the VL imaging mode, the IR imaging pixels are deactivated.

17. The apparatus of claim 11 wherein the apparatus is a camera and a detector.

18. The apparatus of claim 17 wherein the apparatus is integrated into a thin client, a thick client, an automotive, a home furnishing device, and a home appliance.

* * * * *